(12) United States Patent
Jung

(10) Patent No.: US 12,039,053 B2
(45) Date of Patent: Jul. 16, 2024

(54) SECURE PROCESSOR, OPERATING METHOD THEREOF, AND STORAGE DEVICE INCLUDING SAME

(71) Applicant: SAMSUNG ELECTRONICS CO., LTD., Suwon-si (KR)

(72) Inventor: Eun Young Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 17/846,363

(22) Filed: Jun. 22, 2022

(65) Prior Publication Data

US 2023/0141936 A1 May 11, 2023

(30) Foreign Application Priority Data

Nov. 9, 2021 (KR) .......................... 10-2021-0153217
Jan. 21, 2022 (KR) .......................... 10-2022-0009277

(51) Int. Cl.
*G06F 21/57* (2013.01)

(52) U.S. Cl.
CPC ...... *G06F 21/575* (2013.01); *G06F 2221/031* (2013.01)

(58) Field of Classification Search
CPC .................. G06F 21/575; G06F 2221/031
See application file for complete search history.

(56) References Cited

U.S. PATENT DOCUMENTS

| 5,809,290 | A | * | 9/1998 | DeRoo | G06F 7/68 713/500 |
|---|---|---|---|---|---|
| 6,871,210 | B1 | * | 3/2005 | Subramanian | H04L 9/40 709/200 |
| 7,370,186 | B1 | * | 5/2008 | Lilliebjerg | G06F 9/4401 713/1 |
| 7,480,755 | B2 | | 1/2009 | Herrell et al. | |
| 8,239,686 | B1 | * | 8/2012 | Hodzic | G06F 21/52 713/187 |
| 8,332,653 | B2 | | 12/2012 | Buer | |
| 8,478,974 | B2 | | 7/2013 | Wilson et al. | |
| 8,694,794 | B2 | | 4/2014 | Ishida et al. | |
| 10,191,858 | B2 | | 1/2019 | Tsirkin | |
| 2011/0154484 | A1 | * | 6/2011 | Shimabe | G06F 21/575 726/19 |
| 2011/0320797 | A1 | * | 12/2011 | Wilson | G06F 21/575 713/1 |

FOREIGN PATENT DOCUMENTS

KR 10-2019-0005094 1/2019

* cited by examiner

*Primary Examiner* — Beemnet W Dada
(74) *Attorney, Agent, or Firm* — Muir Patent Law, PLLC

(57) ABSTRACT

Provided are a secure processor, an operating method thereof, and a storage device including the secure processor. Provided is a secure processor including a secure core including a vector table register containing boot-up address information, and a vector table register controller configured to communicate with the secure core, wherein the vector table register controller includes a lock controller configured to lock the vector table register and a count register configured to store a lock count value that is the number of times the boot-up address information of the vector table register is updated.

20 Claims, 7 Drawing Sheets

SECURE PROCESSOR, OPERATING METHOD THEREOF, AND STORAGE DEVICE INCLUDING SAME

CROSS-REFERENCE TO RELATED APPLICATIONS

This application claims priority from Korean Patent Application No. 10-2021-0153217 filed on Nov. 9, 2021, in the Korean Intellectual Property Office and Korean Patent Application No. 10-2022-0009277 filed on Jan. 21, 2022, in the Korean Intellectual Property Office, and all the benefits accruing therefrom under 35 U.S.C. 119, the contents of each of which in its entirety are herein incorporated by reference.

BACKGROUND

1. Field

Embodiments relate to a secure processor, an operating method thereof, and a storage device including the same.

2. Description of the Related Art

In a boot-up process of a storage device, it is important to maintain the reliability of firmware or read-only memory (ROM) code that is loaded.

SUMMARY

An embodiment is directed to a secure processor including, a secure core including a vector table register containing boot-up address information, and a vector table register controller configured to communicate with the secure core, wherein the vector table register controller includes a lock controller configured to lock the vector table register and a count register configured to store a lock count value that is the number of times the boot-up address information of the vector table register is updated.

An embodiment is directed to a storage device including a storage controller configured to control an operation of the storage device, wherein the storage controller includes a secure processor, wherein the secure processor includes, a secure core including a vector table register containing boot-up address information, and a vector table register controller configured to communicate with the secure core, wherein the vector table register controller includes a lock controller configured to lock the vector table register and a count register configured to store a lock count value that is the number of times the boot-up address information of the vector table register is updated.

An embodiment is directed to a method of operating a secure processor, including, storing boot-up address information in a vector table register inside a secure core, and communicating with the secure core through a vector table register controller, wherein the vector table register controller locks the vector table register through a lock controller and stores a lock count value that is the number of times the boot-up address information of the vector table register is updated in a count register.

BRIEF DESCRIPTION OF THE DRAWINGS

Features will become apparent to those of skill in the art by describing in detail example embodiments with reference to the attached drawings in which.

DETAILED DESCRIPTION

Figure 1:
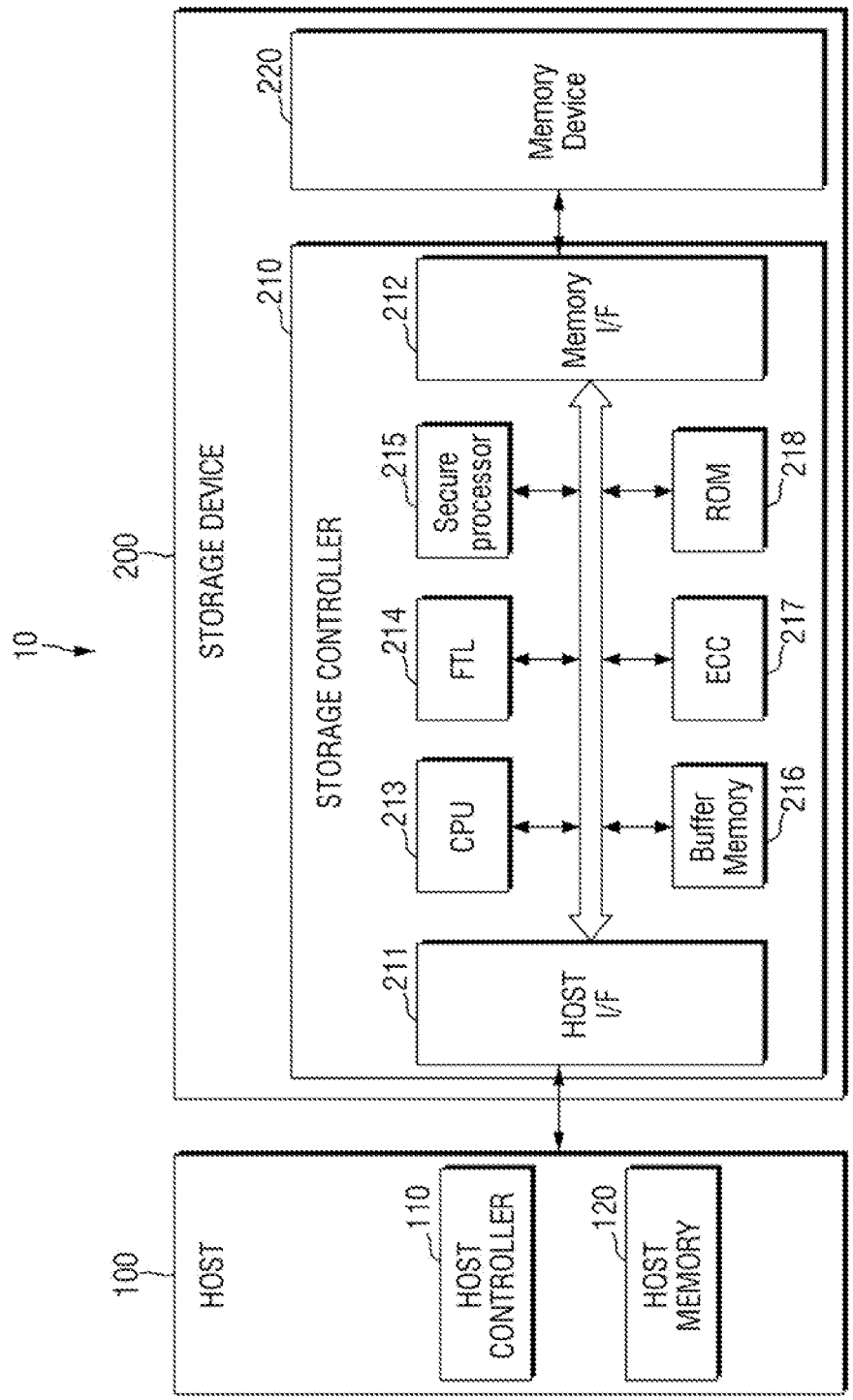
FIG. 1 is a block diagram illustrating a storage system included in a storage device according to some example embodiments.

FIG. 1 is a block diagram illustrating a storage system included in a storage device according to some example embodiments.

Referring to FIG. 1, a storage system 10 may include a host 100 and a storage device 200.

The host 100 may include a host controller 110 and a host memory 120. The host memory 120 may serve as a buffer memory configured to temporarily store data to be transferred to the storage device 200 or data received from the storage device 200.

The storage device 200 may include a storage controller 210 and a memory device 220. The storage device 200 may include storage media configured to store data in response to requests from the host 100. For example, the storage device 200 may include at least one of a solid state drive (SSD), an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a universal flash storage (UFS) standard or an embedded multi-media card (eMMC) standard. Each of the host 100 and the storage device 200 may generate a packet according to an adopted standard protocol and transfer the packet.

When the memory device 220 of the storage device 200 includes a flash memory, the flash memory may include a 2-dimensional (2D) NAND memory array or a 3-dimensional (3D) (or vertical) NAND (VNAND) memory array. As another example, the storage device 200 may include various other kinds of non-volatile memories (NVMs). For example, the storage device 200 may include magnetic random access memory (MRAM), spin-transfer torque MRAM, conductive bridging RAM (CBRAM), ferroelectric RAM (FRAM), phase change RAM (PRAM), resistive RAM (RRAM), and various other types of memories.

The host controller 110 and the host memory 130 may be embodied as separate semiconductor chips, or may be integrated in the same semiconductor chip. The host controller 110 may be any one of a plurality of modules included in an application processor (AP). The AP may be embodied as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the memory device 220 or an operation of storing data (e.g., read data) of the memory device 220 in the buffer region.

The storage controller 210 may include a host interface 211, a memory interface 212, a central processing unit (CPU) 213, a flash translation layer (FTL) 214, a secure processor 215, a buffer memory 216, an error correction code (ECC) engine 217, and a read-only memory (ROM) 218. The storage controller 210 may further include a working memory (not shown) in which the FTL 214 is loaded. The CPU 213 may execute the FTL 214 to control data write and read operations on the memory device 220.

The host interface 211 may transfer and receive packets to and from the host 100. A packet transferred from the host 100 to the host interface 211 may include a command or data to be written to the memory device 220. A packet transferred from the host interface 211 to the host 100 may include a response to the command or data read from the memory device 220. The memory interface 212 may transfer data to be written to the memory device 220 to the memory device 220 or receive data read from the memory device 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of transforming a logical address received from the host 100 into a physical address used to actually store data in the memory device 220. The wear-leveling operation may be a technique for preventing excessive deterioration of a specific block by allowing blocks of the memory device 220 to be uniformly used. As an example, the wear-leveling operation may be embodied using a firmware technique that balances erase counts of physical blocks. The garbage collection operation may be a technique for ensuring usable capacity in the memory device 220 by erasing an existing block after copying valid data of the existing block to a new block.

The secure processor 215 may be, e.g., a baseboard management controller (BMC), or a trusted platform module (TPM). The secure processor 215 may allow secure boot-up for booting up the storage device 200 such that manipulated firmware cannot be loaded to the storage device 200 with an externally manipulated boot-up system while the storage device 200 is being booted up.

The buffer memory 216 may be a component included in the storage controller 210, or may be disposed outside the storage controller 210.

The ECC engine 217 may perform error detection and correction operations on read data read from the memory device 220. For example, the ECC engine 217 may generate parity bits for write data to be written to the memory device 220, and the generated parity bits may be stored in the memory device 220 together with write data. During the reading of data from the memory device 220, the ECC engine 217 may correct an error in the read data by using the parity bits read from the memory device 220 along with the read data, and output error-corrected read data.

The ROM 218 may store data used for booting up the storage device 200. The ROM 218 may include an area that cannot be accessed by a user of the storage system 10. The area that is not accessible by the user may be, e.g., a space in which boot code is stored for use in booting up the storage device 200, and may be an area that cannot be arbitrarily changed by the user and can thus remain secure.

Example embodiments relating to a method and structure of the secure processor 215 for improving the security in the boot-up process of the storage device 200 will be described in detail below.

Figure 2:
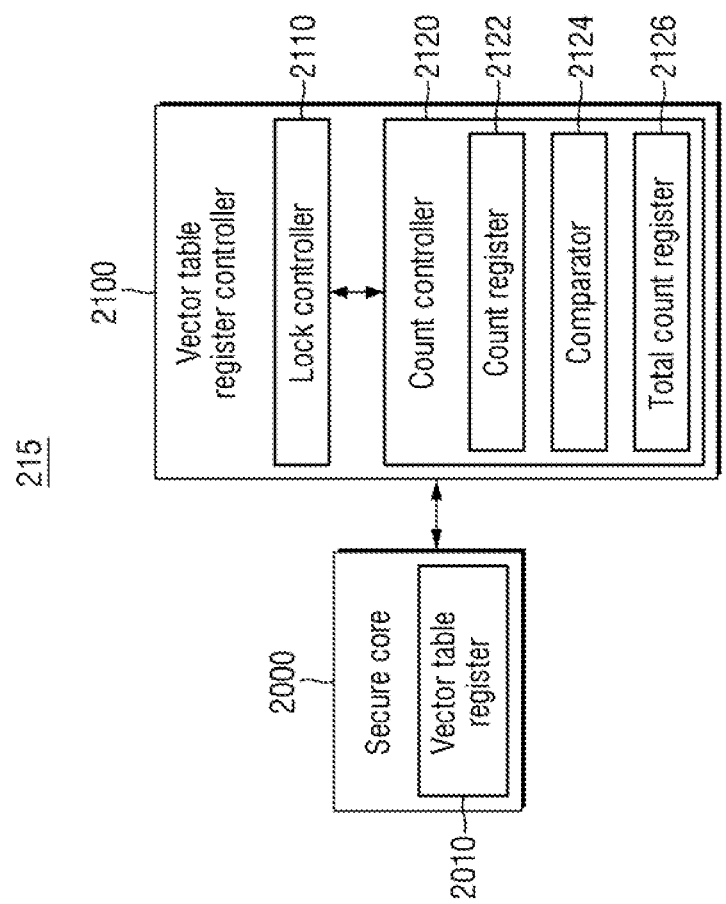
FIG. 2 is a block diagram illustrating a secure processor according to some example embodiments.

FIG. 2 is a block diagram illustrating a secure processor according to some example embodiments.

Referring to FIGS. 1 and 2, the secure processor 215 according to some example embodiments may include a secure core 2000 and a vector table register controller 2100.

The secure core 2000 may control the overall operation of the secure processor 215.

The secure core 2000 may include a vector table register 2010. Boot-up address information, in which data used for booting up the storage device 200 are stored, may be stored in the vector table register 2010. For example, addresses of data used to boot up the storage device 200 and stored in the ROM 218 may be included in the vector table register 2010. In another example, address of data for firmware required to boot up the storage device 200 may be stored in the vector table register 2010.

The vector table register controller 2100 may include a lock controller 2110 and a count controller 2120.

The vector table register controller 2100 may communicate with the secure core 2000, and may lock or unlock the information (e.g., boot-up address information of data used in the boot-up process) stored in the vector table register 2010. For example, the information (e.g., boot-up address information required in the boot-up process) stored in the vector table register 2010 may be locked or unlocked through the lock controller 2110 and the count controller 2120 included in the vector table register controller 2100. This may help to improve the security of secure boot-up in the boot-up process of the storage device 200.

For example, the lock controller 2110 may determine whether to lock or unlock the boot-up address information stored in the vector table register 2010. For example, an operation performed by the lock controller 2110 to lock the boot-up address information stored in the vector table register 2010 may be a hardware-based locking operation. For example, the lock controller 2110 may perform a lock by disconnecting a fuse from the vector table register 2010. Accordingly, the lock controller 2110 may prevent an external attempt to hack or manipulate the boot-up address information stored in the vector table register 2010

When it is determined that the boot-up address information stored in the vector table register 2010 should be updated, the lock controller 2110 may unlock the boot-up address information stored in the vector table register 2010. Through this, the firmware loaded during the boot-up process of the storage device 200 may update the boot-up address information stored in the vector table register 2010.

In this case, the count controller 2120 may manage the number of times the boot-up address information stored in the vector table register 2010 is updated and the total number of pieces of boot-up address information used for booting up the storage device 200.

The count controller 2120 may include a count register 2122, a comparator 2124, and a total count register 2126.

The total count register 2126 may store the total count value, which is the total number of pieces of the boot-up address information used for booting up the storage device 200.

The total count value may be, e.g., N (N is a positive integer). For example, the total count value may be a value indicating the total number of pieces of boot-up address information including boot-up address information of a ROM used for booting up the storage device 200, boot-up address information of a boot loader, and boot-up address information of other firmware required to boot up the storage device 200.

The count register 2122 may store a lock count value indicating the number of times the boot-up address information stored in the vector table register 2010 is updated. The lock count value may be, e.g., the number of times the lock controller 2110 performs a lock on the vector table register 2010.

For example, when the boot-up address information of the ROM is updated to the vector table register 2010 and a lock is performed in the boot-up process of the storage device 200, the lock count value increases from 0 to 1. Thereafter, when the boot-up address information of the boot loader is updated to the vector table register 2010 and a lock is performed, the lock count value increases from 1 to 2. Then, when the boot-up address information of another firmware required to boot up the storage device 200 is updated to the vector table register 2010 and a lock is performed, the lock count value increases from 2 to 3.

That is, during the boot-up process of the storage device 200, the lock count value stored in the count register 2122 may be counted up until it is equal to N, which is the total count value.

In another example, when the boot-up address information of the ROM is updated to the vector table register 2010 and a lock is performed in the boot-up process of the storage device 200, the lock count value may be initiated by setting the lock count value to 0. In this case, the total count value N may represent a value excluding the boot-up address information of the ROM from among the pieces of boot-up address information updated to the vector table register 2010 during the boot-up process of the storage device 200.

When a request for updating the boot-up address information to the vector table register 2010 is received in the boot-up process of the storage device 200, the count controller 2120 may compare the lock count value of the count register 2122 with the total count value of the total count register 2126 by using the comparator 2124, and provide a result of the comparison to the lock controller 2110. For example, the comparator 2124 may determine whether the lock count value is smaller than the total count value, and the result of the determination may be provided to the lock controller 2110.

The lock controller 2110 may unlock the vector table register 2010 when the lock count value is smaller than the total count value. Thereafter, the boot-up address information in the vector table register 2010 may be updated. When the boot-up address information in the vector table register 2010 is updated, the lock controller 2110 may re-lock the vector table register 2010.

This will now be described with respect to a ladder diagram shown in FIG. 3 below.

Figure 3:
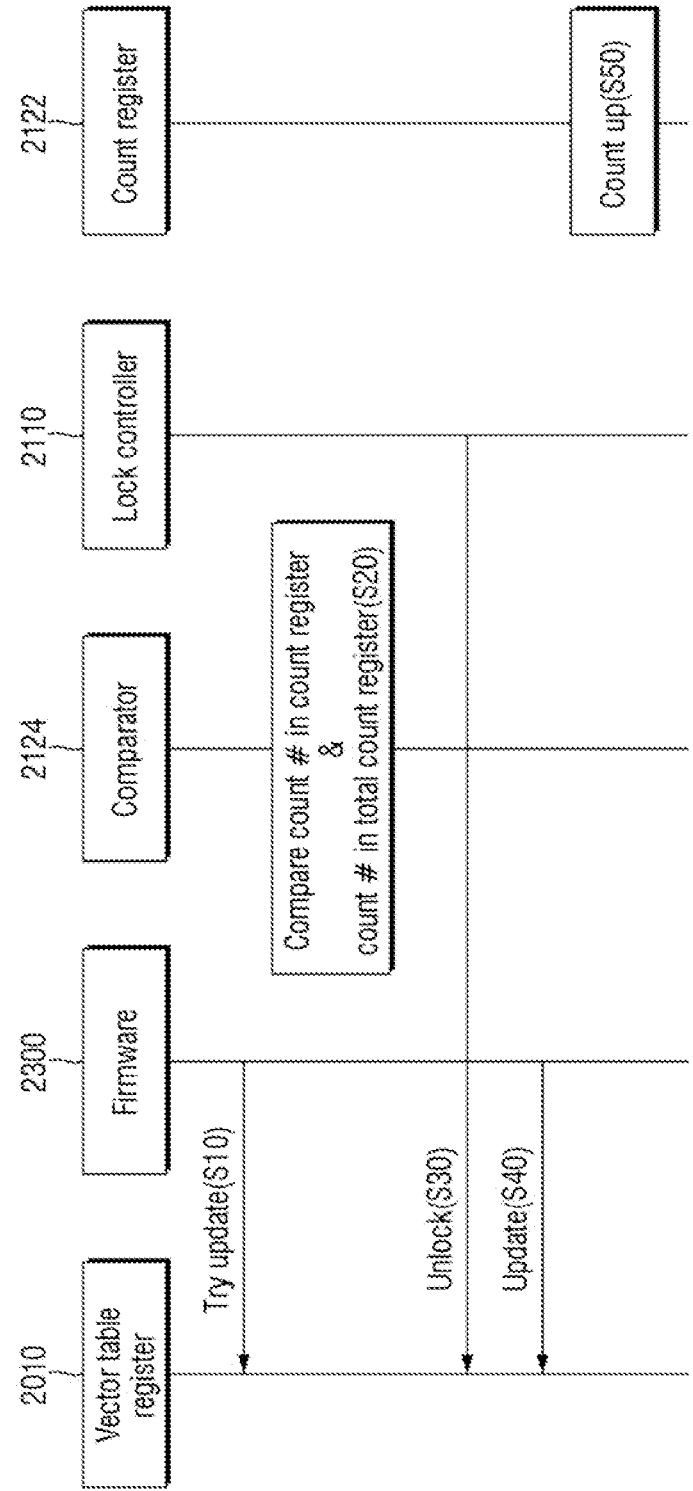
FIG. 3 is a ladder diagram for describing an operation of a secure processor according to some example embodiments.

FIG. 3 is a ladder diagram for describing an operation of a secure processor according to some example embodiments.

Referring to FIGS. 1 to 3, e.g., it is assumed that firmware 2300 is to be loaded in order to boot up the storage device 200. Although not illustrated in FIG. 1, the firmware 2300 may be arbitrary firmware that may be placed in the storage controller 210.

The firmware 2300 issues a request, for updating boot-up address information, to the vector table register 2010 in S10.

In this case, a lock count value of the count register 2122 is compared with the total count value of the total count register 2126 by using the comparator 2124 in S20. Specifically, the comparator 2124 determines whether the lock count value is smaller than the total count value, and provides the determined result to the lock controller 2110.

At this time, the lock controller 2110 may determine whether to lock or unlock the boot-up address information stored in the vector table register 2010. For example, an operation performed by the lock controller 2110 to lock the boot-up address information stored in the vector table register 2010 may be a hardware-based locking operation. For example, the lock controller 2110 may perform a lock by disconnecting a fuse from the vector table register 2010. Accordingly, the lock controller 2110 may prevent any external attempt to hack or manipulate the boot-up address information stored in the vector table register 2010

When it is determined that the boot-up address information stored in the vector table register 2010 needs to be updated, the lock controller 2110 may unlock the boot-up address information stored in the vector table register 2010 in S30. Through this, the firmware loaded during the boot-up process of the storage device 200 may update the boot-up address information stored in the vector table register 2010 in S40.

Thereafter, the count register 2122 may increase the lock count value, which indicates the number of times the boot-up address information stored in the vector table register 2010 is updated, by 1 in S50. The lock count value may be, e.g., the number of times the lock controller 2110 performs a lock on the vector table register 2010.

The operation of the secure processor 215 described above will now be described with reference to flowcharts shown in FIGS. 4 and 5 below.

Figure 4:
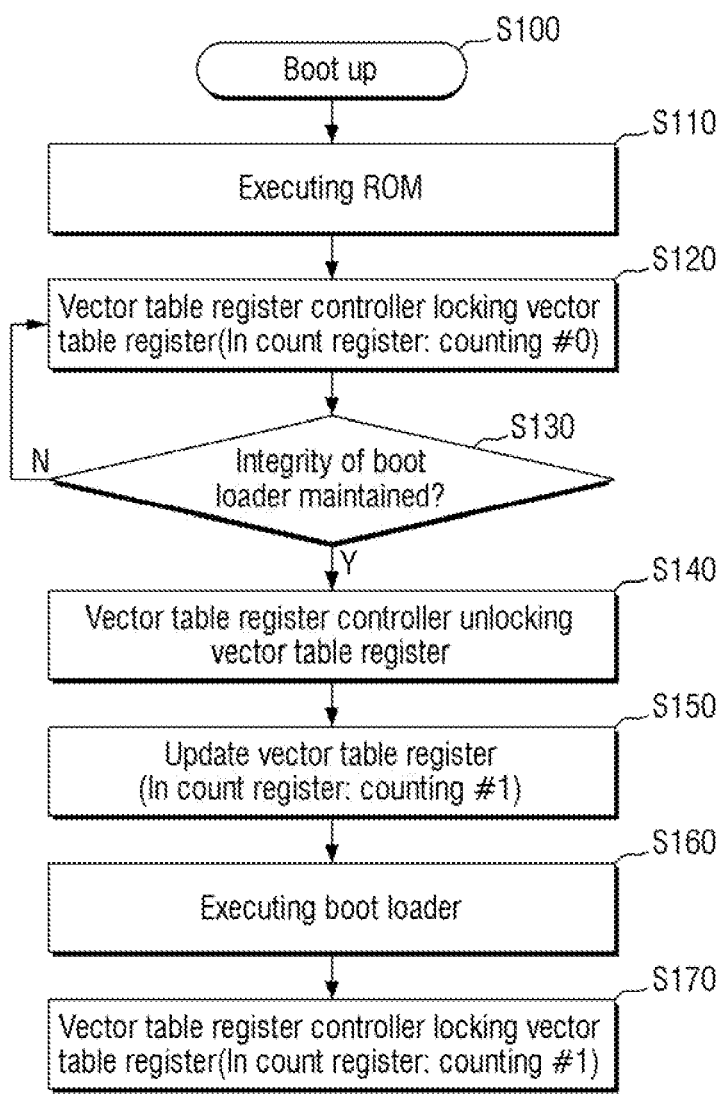
FIGS. 4 and 5 are flowcharts for describing an operation of a secure processor according to some example embodiments.
Figure 5:
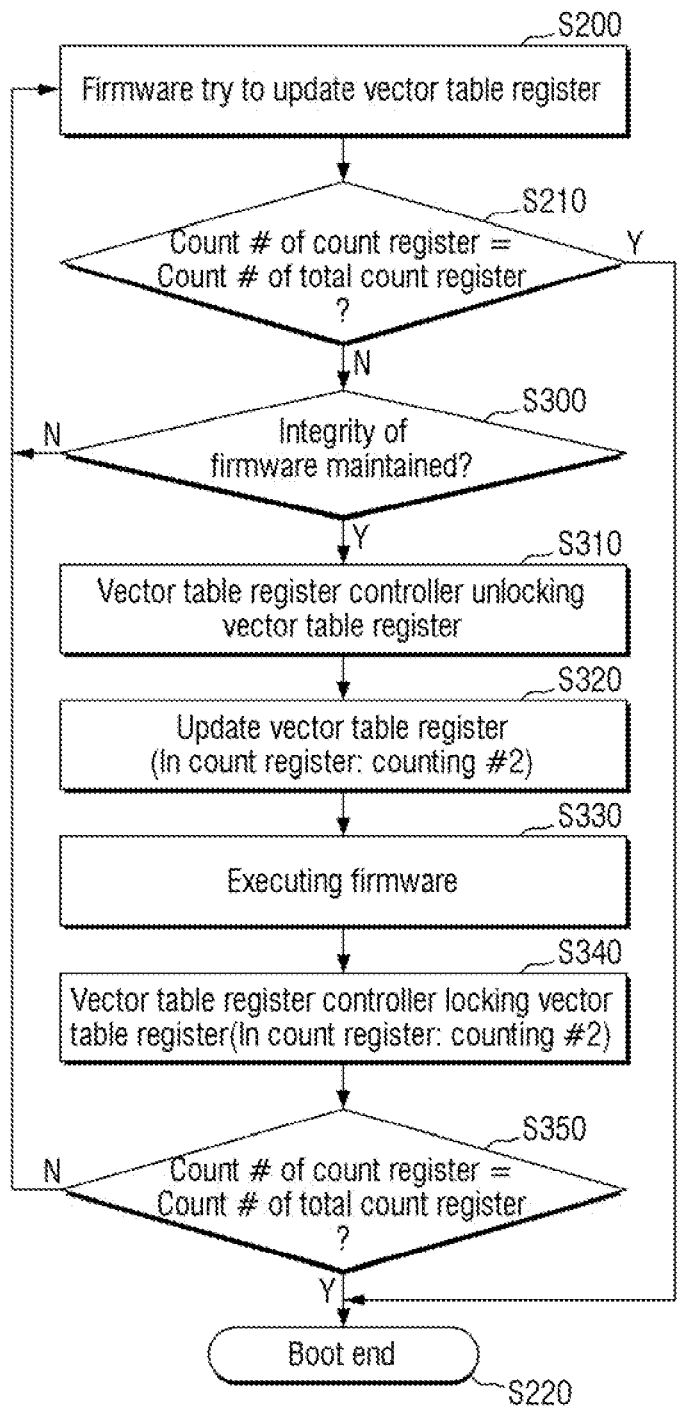

FIGS. 4 and 5 are flowcharts for describing an operation of a secure processor according to some example embodiments.

An operation of the secure processor according to some example embodiments in the boot-up process of the storage device 200 will now be described with reference to FIGS. 1, 2, and 4.

First, a boot-up processing of the storage device 200 begins in S100. When the boot-up process begins, the CPU 213 may execute the ROM 218 in S110. In this case, the vector table register controller 2100 performs a lock on the vector table register 2010. At this time, the lock count value stored in the count register 2122 of the count controller 2120 is 0.

When the boot-up process of the storage device 200 beings, the ROM 218 verifies the integrity of the boot loader in S130. At this time, verification of the integrity of the boot loader may be performed by determining whether a value provided by software of the boot loader is different from a predetermined value. The integrity of the boot loader being verified or that verification passes may mean that the boot loader is not changed by any external intervention.

When it is determined that the integrity of the boot loader is not maintained (N), the vector table register controller 2100 maintains the locked state of the vector table register 2010.

If it is determined that the integrity of the boot loader is maintained (Y), the vector table register controller 2100 unlocks the vector table register 2010 in S140.

Thereafter, the boot-up address information for executing the boot loader is updated to the vector table register 2010 in S150.

Then, the boot loader is executed in S160.

Thereafter, the vector table register controller 2100 sets the vector table register 2010 to a locked state, and the lock count value stored in the count register 2122 is counted up by 1 and then stored.

In FIG. 4, it is assumed that the lock count value at the time of executing the ROM after booting is 0 and the lock count value is counted up by 1 when the boot-up address information for the boot loader is updated to the vector table register 2010.

It should be noted that the above description is applicable to an operation of updating boot-up address information to the vector table register 2010 according to the integrity verification of firmware loaded during the boot-up process of another storage device 200 after executing the boot loader.

An operation of the secure processor according to some example embodiments in the boot-up process of the storage device 200 will now be described with reference to FIGS. 1, 2, and 5.

The firmware used to boot up the storage device 200 attempts to update boot-up address information to the vector table register 2010 in the boot-up process of the storage device 200 in S200.

In this case, the comparator 2124 of the count controller 2120 compares the lock count value of the count register 2122 and the total count value of the total count register 2126.

If the lock count value is the same as the total count value (Y), the update of the boot-up address information to the vector table register 2010 is blocked and the boot-up process is terminated in S220.

Otherwise, if it is determined that the lock count value is smaller than the total count value (N), e.g., the secure core 2000 determines whether the integrity of the firmware is maintained in S300.

If it is determined that the integrity of the firmware is not maintained (N), another firmware's update of the boot-up address information to the vector table register 2010 may be waited for.

Otherwise, if it is determined that the integrity of the firmware is maintained (Y), the vector table register controller 2100 unlocks the vector table register 2010 in S310.

In addition, the boot-up address information of the vector table register 2010 is updated to one associated with the firmware, and the lock count value of the count register 2122 is counted up to 2 in S320. For reference, in FIG. 5, the description is made under the assumption that the lock count value is 1 as the boot-up address information of the boot loader is updated in FIG. 4.

Thereafter, the firmware is executed in S330.

Then, the vector table register controller 2100 performs a lock on the vector table register 2010. At this time, the lock count value is maintained as 2.

Thereafter, the comparator 2124 compares the counted-up lock count value with the total count value.

If the lock count value is not the same as the total count value (N), it indicates that the boot-up address information is to be loaded in the boot-up process of the storage device 200, and hence an update request from another firmware is waited for.

Otherwise, if the lock count value is equal to the total count value (Y), it is determined that the boot-up address information used for booting up the storage device 200 is no longer required, and the boot-up process is terminated in S220.

Figure 6:
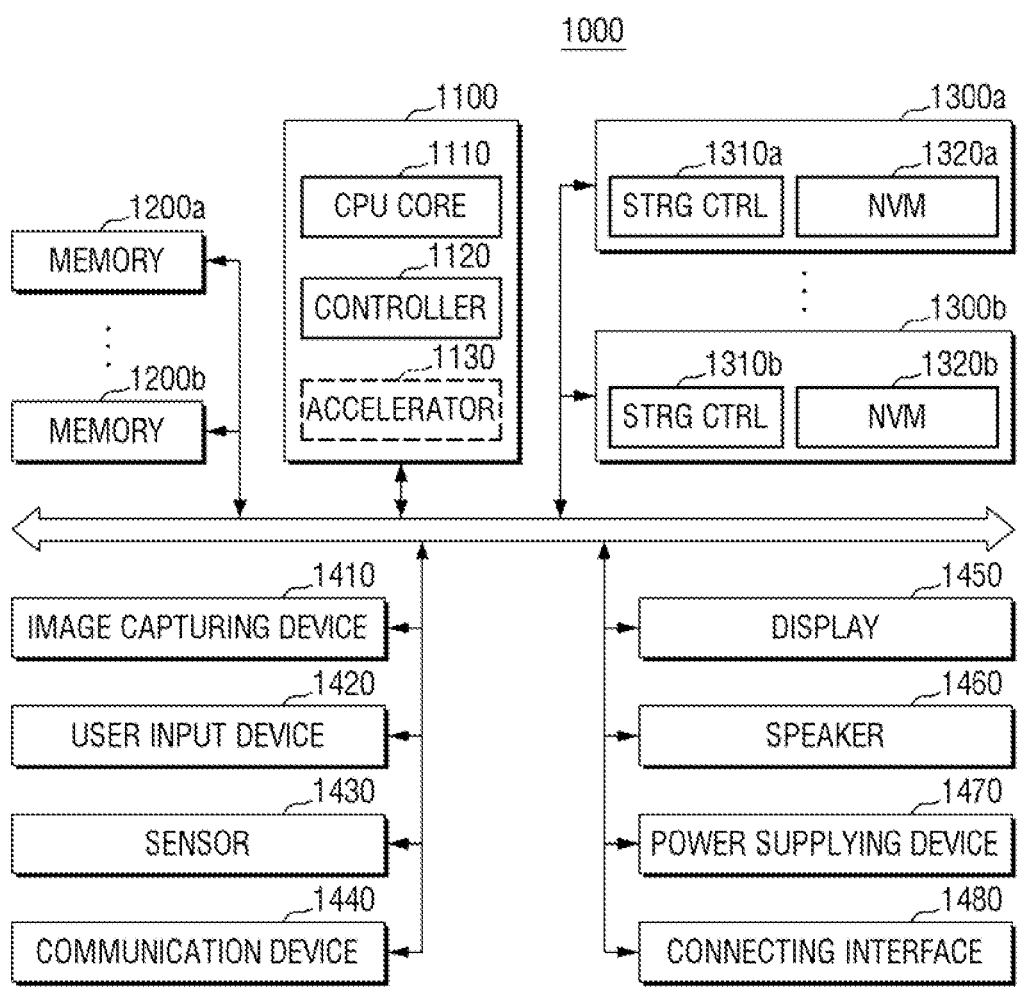
FIG. 6 is a diagram of a data center to which a storage device is applied according to some example embodiments.

FIG. 6 is a diagram of a data center to which a storage device is applied according to some example embodiments.

FIG. 6 is a diagram of a system 1000 to which a secure processor may be applied according to an example embodiment. The system 1000 of FIG. 6 may be a mobile system, such as a mobile phone, a smartphone, a tablet personal computer (PC), a wearable device, a healthcare device, or an Internet-of-things (IoT) device, a PC, a laptop computer, a server, a media player, or an automotive device, such as a navigation system.

Referring to FIG. 6, the system 1000 may include a main processor 1100, memories 1200*a* and 1200*b*, storage devices 1300*a* and 1300*b*, an optical input device 1410, a user input device 1420, a sensor 1430, a communication device 1440, a display 1450, a speaker 1460, a power supplying device 1470, and a connecting interface 1480.

The main processor 1100 may control the overall operations of the system 1000, e.g., operations of other components constituting the system 1000. The main processor 1100 may be implemented as a general-purpose processor, an exclusive processor, an application processor, or the like.

The main processor 1100 may include one or more CPU cores 1110, and a controller 1120 for controlling the memories 1200*a* and 1200*b* and/or the storage devices 1300*a* and 1300*b*. The main processor 1100 may further include an accelerator 1130, which may be an exclusive circuit for high-speed data computation, such as Artificial Intelligence (AI) data computation. The accelerator 1130 may include a graphics processing unit (GPU), a neural processing unit (NPU), a data processing unit (DPU), and/or the like, and may be realized as a separate chip that is physically separated from other components of the main processor 1100.

The memories 1200*a* and 1200*b* may be used as a main memory device of the system 1000. The memories 1200*a* and 1200*b* may include volatile memories, such as static RAM (SRAM), DRAM, and/or the like, or may include non-volatile memories, such as flash memory, phase RAM (PRAM), resistive RAM (RRAM), and/or the like. The memories 1200*a* and 1200*b* may be embodied in the same package as the main processor 1100.

The storage devices 1300*a* and 1300*b* may serve as non-volatile storage devices configured to store data regardless of whether power is supplied thereto, and may have larger storage capacity than the memories 1200*a* and 1200*b*. The storage devices 1300*a* and 1300*b* may respectively include storage controllers 1310*a* and 1310*b* and NVMs 1320*a* and 1320*b* configured to store data under the control of the storage controllers 1310*a* and 1310*b*. The NVMs 1320*a* and 1320*b* may include V-NAND flash memories having a 2D structure or a 3D structure, or the NVMs 1320*a* and 1320*b* may include other types of NVMs, such as PRAM and/or RRAM.

The storage devices 1300*a* and 1300*b* may be physically separated from the main processor 1100 and included in the system 1000 or embodied in the same package as the main processor 1100. In addition, the storage devices 1300*a* and 1300*b* may have types of memory cards and be removably combined with other components of the system 1000 through an interface, such as the connecting interface 1480 that will be described below. The storage devices 1300*a* and 1300*b* may be devices to which a standard protocol, such as a universal flash storage (UFS), an embedded multi-media card (eMMC), or non-volatile memory express (NVMe) is applied, without being limited thereto.

The storage devices 1300*a* and 1300*b* may include, e.g., a storage device to which the storage device 200 of FIG. 1 is applied in accordance with some example embodiments.

The optical input device 1410 may capture still images or moving images. The optical input device 1410 may include a camera, a camcorder, a webcam, and/or the like.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transfer and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transferring and receiving data to and from the system 1000. The connecting interface 1480 may be embodied by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 7:
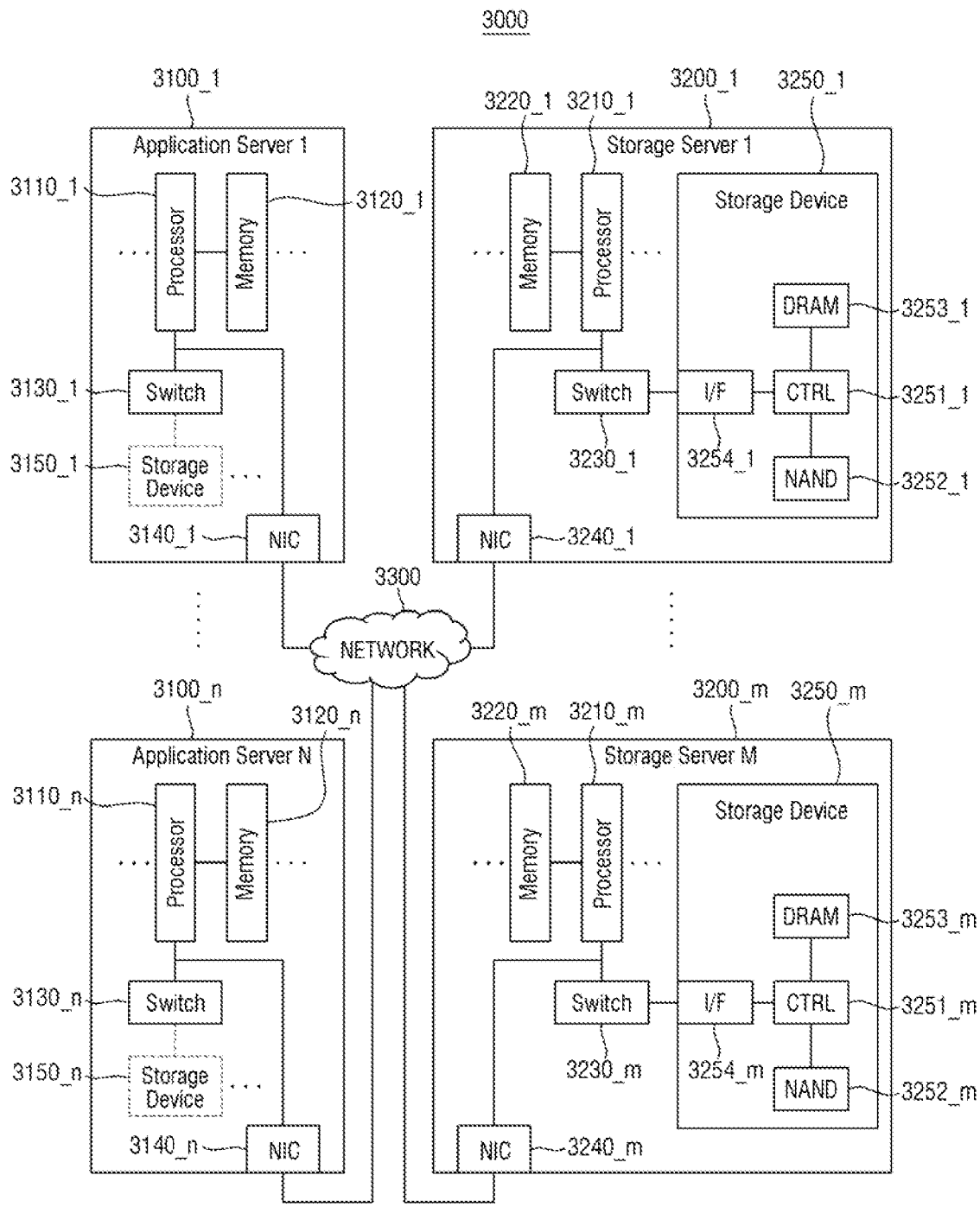
FIG. 7 is a diagram of a data center to which a storage device is applied according to some example embodiments.

FIG. 7 is a diagram of a data center to which a storage device is applied according to some example embodiments.

Referring to FIG. 7, a data center 3000 may be a facility that collects various types of data and provides various services, and may be referred to as a data storage center. The data center 3000 may be a system for operating search engines and databases, and may be a computing system used by companies, such as banks or government agencies. The data center 3000 may include application servers 3100_1 to 3100_n and storage servers 3200_1 to 3200_m. The number of the application servers 3100_1 to 3100_n and the number of the storage servers 3200_1 to 3200_m may be varied. The number of the application servers 3100_1 to 3100_n and the number of the storage servers 3200_1 to 3200_m may differ from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control the overall operation of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, and/or a non-volatile DIMM (NVDIMM). The number of the processors 3210 and the number of the memories 3220 included in the storage server 3200 may be varied. The processor 3210 and the memory 3220 may provide a processor-memory pair. The number of the processors 3210 and the number of the memories 3220 may be different from each other. The processor 3210 may include a single core processor or a multiple core processor. The above description of the storage server 3200 may be similarly applied to the application server 3100. The application server 3100 may not include the storage device 3150. The storage server 3200 may include at least one storage device 3250. The number of the storage devices 3250 included in the storage server 3200 may be varied.

The application servers 3100_1 to 3100_n and the storage servers 3200_1 to 3200_m may communicate with each other through a network 3300. The network 3300 may be implemented using a fiber channel (FC) or an Ethernet. In this case, the FC may be a medium used for a relatively high speed data transmission, and an optical switch that provides high performance and/or high availability may be used. The storage servers 3200_1 to 3200_m may be provided as file storages, block storages, or object storages according to an access scheme of the network 3300.

The network 3300 may be a storage-only network or a network dedicated to a storage, such as a storage area network (SAN). For example, the SAN may be an FC-SAN that uses an FC network and is implemented according to an FC protocol (FCP). In another example, the SAN may be an IP-SAN that uses a transmission control protocol/internet protocol (TCP/IP) network and is implemented according to an iSCSI (a SCSI over TCP/IP or an Internet SCSI) protocol. In another example, the network 3300 may be a general or normal network such as the TCP/IP network. For example, the network 3300 may be implemented according to at least one of protocols, such as an FC over Ethernet (FCoE), a network attached storage (NAS), an NVMe over Fabrics (NVMe-oF), etc.

Hereinafter, a description will be given focusing on the application server 3100_1 and the storage server 3200_1. The description of the application server 3100_1 may be applied to the other application server 3100_n, and the description of the storage server 3200_1 may be applied to the other storage server 3200_m.

The application server 3100_1 may store data requested to be stored by a user or a client into one of the storage servers 3200_1 to 3200_m through the network 3300. In addition, the application server 3100_1 may obtain data requested to be read by the user or the client from one of the storage servers 3200_1 to 3200_m through the network 3300. For example, the application server 3100_1 may be implemented as a web server or a database management system (DBMS).

The application server 3100_1 may access a memory 3120_n or a storage device 3150_n included in the other application server 3100_n through the network 3300, and/or may access memories 3220_1 to 3220_m or storage devices 3250_1 to 3250_m included in the storage servers 3200_1 to 3200_m through the network 3300. Therefore, the application server 3100_1 may perform various operations on data stored in the application servers 3100_1 to 3100_n and/or the storage servers 3200_1 to 3200_m. For example, the application server 3100_1 may execute a command for moving or copying data between the application servers 3100_1 to 3100_n and/or the storage servers 3200_1 to 3200_m. The data may be transferred from the storage devices 3250_1 to 3250_m of the storage servers 3200_1 to 3200_m to the memories 3120_1 to 3120_n of the application servers 3100_1 to 3100_n directly or through the memories 3220_1 to 3220_m of the storage servers 3200_1 to 3200_m. For example, the data transferred through the network 3300 may be encrypted data for security or privacy.

Although not illustrated, the storage devices 3250_1 to 3250_m may include the storage device 200 of FIG. 1 in accordance with some example embodiments.

In the storage server 3200_1, an interface 3254_1 may provide a physical connection between the processor 3210_1 and a controller 3251_1 and/or a physical connection between a network interface card (NIC) 3240_1 and the controller 3251_1. For example, the interface 3254_1 may be implemented based on a direct attached storage (DAS) scheme in which the storage device 3250_1 is directly connected with a dedicated cable. For example, the interface 3254_1 may be implemented based on at least one of various interface schemes, such as ATA, SATA, e-SATA, SCSI, aSAS, PCI, PCIe, NVMe, IEEE 1394, USB, an SD card interface, an MMC interface, an eMMC interface, a UFS interface, an eUFS interface, a CF card interface, etc.

The storage server 3200_1 may further include a switch 3230_1 and the NIC 3240_1. The switch 3230_1 may selectively connect the processor 3210_1 with the storage device 3250_1 or may selectively connect the NIC 3240_1 with the storage device 3250_1 under the control of the processor 3210_1.

The NIC 3240_1 may include a network interface card, a network adapter, or the like. The NIC 3240_1 may be connected to the network 3300 through a wired interface, a wireless interface, a Bluetooth interface, an optical interface, or the like. The NIC 3240_1 may further include an internal memory, a digital signal processor (DSP), a host bus interface, or the like, and may be connected to the processor 3210_1 and/or the switch 3230_1 through the host bus interface. The host bus interface may be implemented as one of the above-described examples of the interface 3254_1. The NIC 3240_1 may be integrated with at least one of the processor 3210_1, the switch 3230_1, and the storage device 3250_1.

In the storage servers 3200_1 to 3200_m and/or the application servers 3100_1 to 3100_n, the processor may transmit a command to the storage devices 3150_1 to 3150_n and 3250_1 to 3250_m or the memories 3120_1 to 3120_n and 3220_1 to 3220_m to program or read data. At this time, the data may be data in which an error is corrected through an ECC engine. For example, the data may be data which has undergone data bus inversion (DBI) or data masking (DM), and may include cyclic redundancy code (CRC) information. The data may be data encrypted for security or privacy.

The storage devices 3150_1 to 3150_m and 3250_1 to 3250_m may transmit a control signal and command/address signals to NAND flash memory devices 3252_1 to 3252_m in response to a read command received from the processor. When data is read from the NAND flash memory devices 3252_1 to 3252_m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251_1 may control the overall operation of the storage device 3250_1. The controller 3251_1 may include an SRAM. The controller 3251_1 may write data to the NAND flash 3252_1 in response to a write command, or may read data from the NAND flash 3252_1 in response to a read command. For example, the write command and/or the read command may be provided from the processor 3210_1 in the storage server 3200_1, the processor 3210_m in the other storage server 3200_m, or the processors 3110_1 and 3110_n in the application servers 3100_1 and 3100_n.

A DRAM 3253_1 may temporarily store (e.g., may buffer) data to be written to the NAND flash 3252_1 or data read from the NAND flash 3252_1. Further, the DRAM 3253_1 may store metadata. Here, the metadata may be data generated by the controller 3251_1 to manage user data or the NAND flash 3252_1. The storage device 3250_1 may include a secure element (SE) for security or privacy.

By way of summation and review, it is important to provide for the reliability of a register (e.g., a vector table register) including address information for firmware or ROM code that is loaded during a boot-up process of a storage device. The vector table register may be stored in a core that controls a secure processor in a storage controller of the storage device. A separate device for maintaining the security of information in the vector table register may be provided.

As described above, an example embodiment may provide a secure processor with enhanced security for a vector table register included in a core of the secure processor. An example embodiment may provide a storage device including a secure processor with enhanced security for a vector table register included in a core of the secure processor. An example embodiment may provide a method of operating a secure processor with enhanced security for a vector table register included in a core of a secure processor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed:
1. A secure processor, comprising:
a secure core including a vector table register for boot-up address information; and
a vector table register controller configured to communicate with the secure core, the vector table register controller including:
a lock controller configured to lock the vector table register; and
a count register configured to store a lock count value that is a number of times the boot-up address information of the vector table register is updated.
2. The secure processor as claimed in claim 1, wherein the vector table register controller further includes a total count register configured to store a total count value that is a total number of pieces of the boot-up address information used for a boot-up process.
3. The secure processor as claimed in claim 2, wherein the vector table register controller further includes a comparator, the comparator being configured to provide, to the lock controller, a result of a comparison between the lock count value and the total count value.
4. The secure processor as claimed in claim 3, wherein the lock controller is configured to lock the vector table register when the lock count value is the same as the total count value.

5. The secure processor as claimed in claim 1, wherein the lock controller is configured to lock the vector table register during integrity verification of firmware loaded in a boot-up process.

6. The secure processor as claimed in claim 5, wherein the lock controller is configured to unlock the vector table register when the integrity verification of the firmware passes.

7. The secure processor as claimed in claim 1, wherein the lock count value is counted up when the vector table register is locked.

8. A storage device, comprising:
a storage controller configured to control an operation of the storage device, the storage controller including a secure processor that includes:
a secure core including a vector table register containing boot-up address information; and
a vector table register controller configured to communicate with the secure core,
wherein the vector table register controller includes:
a lock controller configured to lock the vector table register; and
a count register configured to store a lock count value that is a number of times the boot-up address information of the vector table register is updated.

9. The storage device as claimed in claim 8, wherein the vector table register controller further includes a total count register configured to store a total count value that is a total number of pieces of the boot-up address information used for a boot-up process.

10. The storage device as claimed in claim 9, wherein the vector table register controller further includes a comparator, the comparator being configured to provide, to the lock controller, a result of a comparison between the lock count value and the total count value.

11. The storage device as claimed in claim 10, wherein the lock controller is configured to lock the vector table register when the lock count value is the same as the total count value.

12. The storage device as claimed in claim 8, wherein the lock controller is configured to lock the vector table register during integrity verification of firmware loaded in a boot-up process.

13. The storage device as claimed in claim 12, wherein the lock controller is configured to unlock the vector table register when the integrity verification of the firmware passes.

14. The storage device as claimed in claim 8, wherein the lock count value is counted up when the vector table register is locked.

15. A method of operating a secure processor, comprising:
storing boot-up address information in a vector table register inside a secure core; and
communicating with the secure core through a vector table register controller,
wherein the vector table register controller locks the vector table register through a lock controller and stores a lock count value, which is a number of times the boot-up address information of the vector table register is updated, in a count register.

16. The method as claimed in claim 15, further comprising storing, by the vector table register controller, a total count value, which is a total number of pieces of the boot-up address information used for a boot-up process, in a total count register.

17. The method as claimed in claim 16, further comprising providing, by the vector table register controller, a result of a comparison between the lock count value and the total count value to the lock controller.

18. The method as claimed in claim 15, wherein the lock controller locks the vector table register during integrity verification of firmware loaded in a boot-up process.

19. The method as claimed in claim 18, wherein the lock controller unlocks the vector table register when the integrity verification of the firmware passes.

20. The method as claimed in claim 15, wherein the lock count value is counted up when the vector table register is locked.

* * * * *